United States Patent
Yamaguchi

(10) Patent No.: US 8,162,759 B2
(45) Date of Patent: Apr. 24, 2012

(54) NETWORK GAME SYSTEM, NETWORK GAME PROGRAM, NETWORK GAME APPARATUS, AND NETWORK GAME CONTROL METHOD

(75) Inventor: Tsuyoshi Yamaguchi, Osaka (JP)

(73) Assignee: Konami Digital Entertainment Co., Ltd., Tokyo (JP)

(*) Notice: Subject to any disclaimer, the term of this patent is extended or adjusted under 35 U.S.C. 154(b) by 565 days.

(21) Appl. No.: 12/365,499

(22) Filed: Feb. 4, 2009

(65) Prior Publication Data

US 2009/0221373 A1 Sep. 3, 2009

(30) Foreign Application Priority Data

Feb. 28, 2008 (JP) .................................. 2008-047685
Sep. 29, 2008 (JP) .................................. 2008-250523

(51) Int. Cl.
*A63F 13/00* (2006.01)
(52) U.S. Cl. ................ 463/42; 463/29; 463/40; 463/41; 709/203; 709/207; 709/219
(58) Field of Classification Search ............... 463/15–42
See application file for complete search history.

(56) References Cited

U.S. PATENT DOCUMENTS

| | | | | |
|---|---|---|---|---|
| 6,494,783 B2* | 12/2002 | Namba et al. | ..................... | 463/3 |
| 6,884,163 B2* | 4/2005 | Namba et al. | ..................... | 463/1 |
| 7,648,417 B2* | 1/2010 | Sonn | ............................... | 463/42 |
| 7,878,890 B2* | 2/2011 | Toyohara et al. | ................ | 463/3 |
| 7,887,418 B2* | 2/2011 | Kaminagayoshi | .............. | 463/42 |
| 8,052,533 B2* | 11/2011 | Kudo | ............................... | 463/43 |
| 2002/0002643 A1* | 1/2002 | Yamamoto et al. | ............ | 710/73 |
| 2002/0016195 A1* | 2/2002 | Namba et al. | ..................... | 463/3 |
| 2002/0052827 A1* | 5/2002 | Waelbroeck et al. | ........... | 705/37 |
| 2002/0103018 A1* | 8/2002 | Rommerdahl et al. | ......... | 463/16 |

(Continued)

FOREIGN PATENT DOCUMENTS

JP 2000-296269 A 10/2000

(Continued)

OTHER PUBLICATIONS

"Jikkyou Pawafuru Puro Yakyu 13 Ketteiban Official Guide Complete Edition", Konami Digital Entertainment Co., Ltd., Feb. 21, 2007, First Edition, pp. 582-583.

(Continued)

*Primary Examiner* — Fernando L Toledo
*Assistant Examiner* — Ankush Singal
(74) *Attorney, Agent, or Firm* — Global IP Counselors, LLP

(57) ABSTRACT

A player can be prevented from successively using an object that affects the outcome of a match in a network competition game executed among a plurality of clients via a network. An object is selected at the end of a match event of competition game by a client on the basis of action frequency of an object that has participated in a match event. Next, a notification about the object selected at this point is sent to a server and the object is managed in the server as an object that can not appear in a new match event. A notification about the object being managed in the server is sent to the client if a new match event is to be executed in the client. At this point, the client executes a process for selecting an object from among a plurality of objects excluding the notified object.

7 Claims, 8 Drawing Sheets

U.S. PATENT DOCUMENTS

| | | | |
|---|---|---|---|
| 2003/0168805 A1* | 9/2003 | Samberg | 273/248 |
| 2004/0225386 A1* | 11/2004 | Thompson et al. | 700/92 |
| 2004/0242294 A1* | 12/2004 | Shiozawa | 463/9 |
| 2006/0068918 A1* | 3/2006 | Nagano | 463/42 |
| 2006/0093142 A1* | 5/2006 | Schneier et al. | 380/251 |
| 2007/0077999 A1* | 4/2007 | Inubushi et al. | 463/42 |
| 2007/0244749 A1* | 10/2007 | Speiser et al. | 705/14 |
| 2008/0182660 A1* | 7/2008 | Fulton et al. | 463/29 |
| 2008/0242425 A1* | 10/2008 | Isaka et al. | 463/42 |
| 2008/0275767 A1* | 11/2008 | Rafie | 705/12 |
| 2008/0287175 A1* | 11/2008 | Kusuda et al. | 463/17 |
| 2009/0069095 A1* | 3/2009 | Uno | 463/43 |

FOREIGN PATENT DOCUMENTS

| | | |
|---|---|---|
| JP | 2002-045572 A | 2/2002 |
| KR | 10-2006-0126664 A | 12/2006 |

OTHER PUBLICATIONS

"Power League", Hudson, Game Manual, 1998 (Entered JPO on Aug. 2, 2004), pp. 16-20.

"Play Station 2 Nettchu Proyakyu 2004 Official Guide Book", Syougakukan, Jun. 20, 2004, First Edition, p. 29.

* cited by examiner

 : INDICATES APPEARANCE NOT ALLOWED (CLIENT)

| PITCHER | IDENTIFICATION NUMBER | FIRST MATCH: NUMBER OF PITCHES | SECOND MATCH: NUMBER OF PITCHES | THIRD MATCH: NUMBER OF PITCHES | FOURTH MATCH: NUMBER OF PITCHES | FIFTH MATCH: NUMBER OF PITCHES |
|---|---|---|---|---|---|---|
| a1 | ID-a1 | 100 | | | | |
| a2 | ID-a2 | 10 | 10 | — | 20 | |
| a3 | ID-a3 | 20 | 130 | | | |
| a4 | ID-a4 | — | 10 | 20 | 120 | |
| a5 | ID-a5 | — | — | 100 | | |
| a6 | ID-a6 | — | — | 10 | — | |
| ⋮ | ⋮ | ⋮ | ⋮ | ⋮ | ⋮ | |
| a20 | ID-a20 | — | — | — | — | |
| | ID' | ID-a1 | ID-a3 | ID-a5 | ID-a4 | |

FIG. 4

(SERVER)

| ADDRESS (AD) | FIRST MATCH | SECOND MATCH | THIRD MATCH | FOURTH MATCH |
|---|---|---|---|---|
| 1 | ID-a1 | ID-a3 | ID-a5 | ID-a4 |
| 2 | — | ID-a1 | ID-a3 | ID-a5 |
| 3 | — | — | ID-a1 | ID-a3 |

FIG. 5

 : INDICATES APPEARANCE NOT ALLOWED (CLIENT)

| PITCHER | IDENTIFICATION NUMBER | FIRST MATCH: NUMBER OF PITCHES | SECOND MATCH: NUMBER OF PITCHES | THIRD MATCH: NUMBER OF PITCHES | FOURTH MATCH: NUMBER OF PITCHES | FIFTH MATCH: NUMBER OF PITCHES |
|---|---|---|---|---|---|---|
| a1 | ID-a1 | 100 | | | | |
| a2 | ID-a2 | 10 | 10 | — | 20 | |
| a3 | ID-a3 | 20 | 130 | | | |
| a4 | ID-a4 | — | 10 | 20 | 120 | |
| a5 | ID-a5 | — | — | 100 | | |
| a6 | ID-a6 | — | — | 10 | — | |
| a7 | ID-a7 | 90 | | | | |
| ⋮ | ⋮ | ⋮ | ⋮ | ⋮ | ⋮ | ⋮ |
| a20 | ID-a20 | — | — | — | — | |
| | ID' | ID-a1 | ID-a3 | ID-a5 | ID-a4 | |

FIG. 9

(SERVER)

| ADDRESS (AD) | FIRST MATCH | SECOND MATCH | THIRD MATCH | FOURTH MATCH |
|---|---|---|---|---|
| 1 | ID-a1, ID-a7 | ID-a3 | ID-a5 | ID-a4 |
| 2 | — | ID-a1, ID-a7 | ID-a3 | ID-a5 |
| 3 | — | — | ID-a1, ID-a7 | ID-a3 |

FIG. 10

NETWORK GAME SYSTEM, NETWORK GAME PROGRAM, NETWORK GAME APPARATUS, AND NETWORK GAME CONTROL METHOD

CROSS-REFERENCE TO RELATED APPLICATIONS

This application claims priority to Japanese Patent Application Nos. 2008-047685 and 2008-250523 filed on Feb. 28, 2008 and Sep. 29, 2008 respectively. The entire disclosure of Japanese Patent Application Nos. 2008-047685 and 2008-250523 filed on Feb. 28, 2008 is hereby incorporated herein by reference.

BACKGROUND OF THE INVENTION

1. Field of the Invention

The present invention relates to a network game system, and particularly to a network game system capable of executing a network competition game that is executed by a server computer and a client computer connected to the server computer via a network.

2. Description of the Related Art

The present invention relates to a game program executed in a network game system, a game apparatus constituting the network game system, and a game control method used in the network game system.

Various competition games have conventionally been proposed. These competition games include games executed by a single game apparatus, games executed by a plurality of game apparatuses via a network, as well as other games.

In the latter game, i.e., the network game, a first player and a second player connect their own computer apparatuses to a server computer via a network, whereby the two players can execute a competition game.

A baseball game is an example of a network competition game that can be executed in this manner. Professional Baseball Spirits 4, Konami Digital Entertainment, PS3, released on Apr. 1, 2007 discloses such baseball game as an example. An example of a network baseball game is a type of game in which a player controls the player characters of ones own team and competes for points with a counterpart team commanded by other player.

SUMMARY OF THE INVENTION

In such a baseball game executed via a network, there are cases in which a player commanding team A uses player characters having high abilities in a match so that the team (team A) commanded by the first player can be victorious over a team (team B) commanded by the second player.

There are particular cases in which the player commanding team A constantly uses a pitcher character having high ability, i.e., an ace pitcher character because the pitcher character is a character that has considerable effect on the outcome of the match. Accordingly, the other player experiences dissatisfaction and loses interest in that the pitcher character of team A is always the same pitcher character when competing against the player commanding team A. Such dissatisfaction naturally occurs when the player commanding team A is competing with another player. The choice of whether or not consistently using the same pitcher character in a match in this manner is thus entrusted to the ethics of the player in relation to the game. For this reason, a sense of unfairness is developed between an ethical player and a player lacking such ethics. This sense of unfairness causes dissatisfaction in a player. In addition, since it is not possible for the same pitcher to be made to consistently and successively appear in games in real baseball in this manner, there is a problem that a proper baseball experience cannot be adequately reflected in a realistic manner.

It is possible to consider controlling the game in the following manner in order to resolve the sense of unfairness and lack of realness as described above. For example, the rotation data, data reflecting the number of pitches pitched, and the like of all pitcher characters in all matches are stored in the server. Next, a command that permits the appearance of each pitcher character can be issued by a controller at the same appearance intervals as a pitcher in reality on the basis of the rotation data, data reflecting the number of pitches pitched, and the like of all pitcher characters. The same pitcher character can thereby no longer be repeatedly used, and problems such as those described above can be avoided.

In such a system, there is no problem while the number of players is limited, but a server storage that has enough capacity to accommodate an increase in data is required because the rotation data, the number of pitches data, and the like stored in the server increases as the number of players increases.

In a network baseball game in particular, a player who intends to participate in the baseball game can easily participate in the game without spending a great amount of time and steps. Accordingly, it is possible that the number of participating players in a network baseball game will rapidly increase in accordance with certain timing. A server having a very large storage capacity must be provided in order to handle such a case. However, there is a problem that it is not cost-effective to provide a server having a very large storage capacity in anticipation of such a special case. There is also a problem that a large processing load will be imposed on the server when an attempt is made to process the data of the participating players by using conventional storage capacity.

The present invention was contrived in view of the above-described problems, and an object of the present invention is to provide a system in which a player cannot successively use the same object in a network game executed among a plurality of clients via a network. Another object of the present invention is to provide a system in which the storage capacity of the server is kept low in a network game executed among a plurality of clients via a network.

Specifically, an object of the present invention is to make it impossible for a player to successively use an object that affects the outcome of a match in a network competition game. More specifically, an object of the present invention is to keep the storage capacity of the server low and to make it impossible for a player to successively use an object that affects the outcome of a match.

The network game system according to a first aspect is a network game system capable of executing a network competition game executed in a server computer and in a client computer connected to the server computer via a network. The game system is provided with the following functions.

(1) A competition notification function for causing a first control unit, which is a client, to execute a process for notifying the server of an execution of the competition game;

(2) A competition validation function for causing a second control unit, which is a server, to execute a process for validating the execution of the competition game in the client.

(3) A match execution function for causing the first control unit to execute a match event of a competition game when the execution of the competition game has been validated by the server.

(4) An object selection function for causing the first control unit to execute a process for selecting one object or a plurality of objects for participating in a match event of the competition game from among a plurality of objects on the basis of an input signal from an input part.

(5) An action frequency calculation function for causing the first control unit to calculate an action frequency of the object or objects that have participated in the match event of the competition game.

(6) An object extraction function for causing the first control unit to execute a process for extracting an object from the object or objects on the basis of the action frequency of the object or objects when the match event ends.

(7) An object notification function for causing the first control unit to execute a process for notifying the server about the selected object.

(8) An object management function for causing the second control unit to execute a process for managing, as an object that cannot participate in a new match event of the competition game, the object about which a notification has been sent from the client to the server.

(9) A managed object notification function for causing the second control unit to execute a process for notifying the client about the object being managed in the server, if a new match event of the competition game is to be executed by the first control unit.

In the network game system, a process for notifying the server about the execution of a competition game is executed by the first control unit, which is the client, in the competition notification function. In the competition validation function, a process for validating the execution of a competition game in the client is executed by the second control unit, which is the server.

In the match execution function, a match event of a competition game is executed by the first control unit when the execution of the competition game has been validated by the server. In the object selection function, a process for selecting one object or a plurality of objects for participating in a match event of a competition game from among a plurality of objects is executed by the first control unit on the basis of an input signal from an input part.

In the action frequency calculation function, the action frequency of the object or objects that have participated in a match event of a competition game is calculated by the first control unit. In the object extraction function, a process for extracting an object from the object or objects is executed by the first control unit on the basis of the action frequency of the object or objects when the match event ends. In the object notification function, a process for notifying the server about the selected object is executed by the first control unit.

In the object management function, a process is executed by the second control unit in the object management function so that the object about which a notification has been sent from the client to the server is managed as an object that cannot participate in a match event for a predetermined number of match events. In the managed object notification function, a process for notifying the client about the object being managed in the server, if a new match event of the competition game is to be executed by the first control unit is executed by the second control unit.

In this manner, a process for selecting the object or objects for participating in a new match event from among a plurality of objects, excluding the notified object being managed, is further executed by the first control unit in the object selection function on the basis of an input signal from the input part, if the client has been notified by the server about the object being managed in the server.

For example, when a baseball game is to be executed by using the present network game system, first, a process for notifying the server of the execution of a baseball game is executed by the first control unit, which is the client. A process in which the server validates the execution of a baseball game is executed by the second control unit, which is the server. The match event of a baseball game is executed by the first control unit when the execution of the baseball game has been validated by the server.

Next, a process for selecting player characters that are to appear in the match event of a baseball game from among a plurality of player characters is executed by the first control unit on the basis of an input signal from a control unit. Specifically, a process for selecting a pitcher character that is to appear in the match event of a baseball game from among a plurality of pitcher characters is executed by the first control unit on the basis of an input signal from a controller. Following is a description of an example in which the player character is a pitcher character.

Next, the number of pitches thrown by the pitcher character that has appeared in the baseball game as a match event (action frequency) is calculated by the first control unit. The first control unit executes a process for selecting any single pitcher character from among a plurality of pitcher characters that have appeared in the baseball game as a match event on the basis of the number of pitches thrown by each of the plurality of pitcher characters that appeared in the baseball game as a match event when the match event ends. At this point, a process for notifying the server about the selected pitcher character is executed by the first control unit.

Next, a process for managing the pitcher character notified from the client to the server as a pitcher character that cannot participate in a new match event of a baseball game is executed by the second control unit. If the new match event of a baseball game is to be executed by the first control unit, a process for notifying the client about the pitcher character being managed in the server is executed by the second control unit.

In this manner, a process for selecting at least one pitcher character for participating in a new match event from among a plurality of pitcher characters excluding the notified pitcher character being managed is further executed by the first control unit on the basis of an input signal from the controller, if the client has been notified by the server about the pitcher character being managed in the server.

In this case, when the match event ends, the client selects any single pitcher character from among the plurality of pitcher characters that appeared in the baseball game as a match event. The selection is made on the basis of the number of pitches of each of the plurality of pitcher characters that appeared in the baseball game as a match event. A notification about the pitcher character selected in this case is sent to the server and the pitcher character is managed in the server as a pitcher character that cannot participate in a new match event of a baseball game. When a new match event of a baseball game is executed in the client, the pitcher character being managed in the server, i.e., a notification about the pitcher character that cannot participate in a new match event is sent to the client.

In this manner, in the network game system according to the first aspect, a pitcher character having high ability is selected by the client on the basis of the number of pitches thrown by the pitcher character, and a notification about the pitcher character can be sent to the server when the pitcher character having high ability has appeared in a match event, for example. The pitcher character can be restricted so as to be unable to appear in a new match event carried out by the client by managing the pitcher character in the server as a pitcher character that cannot participate in a new match event. A pitcher character can thereby be restricted from successively being used in consecutive matches when a pitcher character having high ability has appeared in a network baseball game.

In the network game system according to the first aspect, the client merely selects a pitcher character having high ability on the basis of the number of pitches thrown by each pitcher character because a pitcher character having high ability is managed by the server. More specifically, the client must execute in each match a process for selecting a pitcher character having high ability on the basis of the number of pitches of each pitcher. After the process has been executed, however, the pitcher character having high ability is no longer required to be stored in a storage unit for each match as long as a notification about the pitcher character having high ability is sent to the server. Accordingly, the storage capacity required by the client can be reduced. This effect increases as the number of matches executed by the client increases.

In the network game system according to the first aspect, the storage capacity of the server does not particularly need to be increased even if the number of players participating in the game increases because only pitcher characters having high ability are managed in the server. In other words, the storage capacity of the server can be kept low.

Stating the above description in general terms, a player can be restricted from successively using an object that affects the outcome of a match in a network competition game executed among a plurality of clients via a network in the network game system according to the first aspect. As a result, the unreasonable use of an object (for example, a usage method in which an ace class pitcher character is successively and constantly made to appear) by some players that conventionally occurred in network games can be avoided, and the selection of player characters that is more approximate to realistic baseball can be performed, whereby a more realistic game can be achieved. The storage capacity imposed on a client can be reduced in a network competition game executed among a plurality of clients via network. Furthermore, the storage capacity imposed on the server can reduced at the same time.

The network game system according to a second aspect is the network game system according to the first aspect, wherein a process for searching for a maximum action frequency from among the action frequencies of the object or objects is executed by the first control unit when the match event ends. Also, a process for extracting an object having the maximum action frequency is executed by the first control unit. These processes are executed in the object extraction function.

If, for example, a baseball game has been executed by using the present network game system, the first control unit executes a process for searching for the maximum number of pitches from among the number of pitches (action frequency) of a pitcher character when a match event ends. A process for selecting a pitcher character that has thrown the maximum number of pitches is executed by the first control unit.

In this manner, in the network game system according to the second aspect, the pitcher character having the highest number of pitches is selected as the pitcher character having the highest ability when the pitcher character having high ability has appeared in the match event, for example. The pitcher character that has thrown the highest number of pitches can thereby be restricted from successively being used in the next consecutive match when a pitcher character having high ability has appeared in a network baseball game. Stating the above description in general terms, a player can be restricted from successively using an object having maximum action frequency in a network competition game executed among a plurality of clients via a network in the network game system according to the second aspect.

The network game system according to a third aspect is the network game system according to the first aspect, wherein a process for searching for an action frequency having a threshold value or higher from among the action frequencies of the object or objects is executed by the first control unit when the match event ends. Also, a process for extracting an object that has acted with the action frequency having a threshold value or higher is executed by the first control unit. These processes are executed in the object extraction function.

For example, if a baseball game has been executed by using the present network game system, the first control unit executes a process for searching for the number of pitches equal to or greater than a predetermined value from among the number of pitches (action frequency) thrown by a pitcher character when the match event ends. Also, the first control unit executes a process for selecting the pitcher character that has thrown the number of pitches equal to or greater than a predetermined value.

In this manner, in the network game system according to the third aspect, the pitcher character having a predetermined number of pitches or higher is selected as the pitcher character having high ability when the pitcher character having high ability has appeared in the match event, for example. The pitcher character that has thrown the highest number of pitches can thereby be restricted from successively being used in the next consecutive match when a pitcher character having high ability has appeared in a network baseball game. Stating the above description in general terms, a player can be restricted from successively using an object having maximum action frequency in a network competition game executed among a plurality of clients via a network in the network game system according to the third aspect.

The network game system according to a fourth aspect is the network game system according to any one aspect of the first through third aspects, wherein a process for managing, as an object that cannot participate in a match event for a predetermined number of match events, the object about which a notification has been sent from the client to the server is executed by the second control unit. This process is executed in the object management function.

For example, if a baseball game has been executed by using the present network game system, management processing is executed by the second control unit for a pitcher character as a pitcher character that cannot participate in a match event for a predetermined number of match events, the client having been notified by the server about the pitcher character.

In this manner, in the network game system according to the fourth aspect, a pitcher character having high ability is selected by the client on the basis of the number of pitches thrown by the pitcher character when the pitcher character having high ability has appeared in a match event, for example, and a notification about the pitcher character can be sent to the server. The pitcher character can be restricted from appearing in a predetermined number of new match events performed by the client by managing the pitcher character in the server as a pitcher character that cannot participate in a new match event. The pitcher character can thereby be restricted from successively being used in the next consecutive predetermined number of matches when a pitcher character having high ability has appeared in a network baseball game.

Stating the above description in general terms, a player can be restricted for a predetermined number of matches from successively using an object that affects the outcome of a match in a network competition game executed among a plurality of clients via a network in the network game system according to the fourth aspect.

The network game system according to a fifth aspect is the network game system according to the fourth aspect, wherein the following function is provided.

(10) In an array stipulation function, an array in which an address number indicating the address of the object being managed is stipulated by the second control unit as an element number, and an identification number of the object that is being managed and is disposed at the address indicated by the address number is stipulated by the second control unit as an element.

In the network game system, the second control unit stipulates in the array stipulation function an array in which an address number indicating the address of the object being managed is an element number, and an identification number of the object being managed and that is disposed in the address indicated by the address number is an element. The second control unit executes in the object management function a process for incrementing the address number of the object being managed each time the match event ends, a process for determining whether the modified address number is a predetermined number or less, and a process for storing in a storage unit of the server the modified address number and an identification number that corresponds to the modified address number, if the modified address number is a predetermined number or less. The objects are thereby managed in the server.

For example, if a baseball game is executed by using the present network game system, the second control unit stipulates an array in which the address number indicating the address of the pitcher character being managed (a pitcher character that cannot participate in a new match event) is an element number and the identification number of the pitcher character that cannot participate in a new match event and that is disposed in the address indicated by the address number is an element. The second control unit executes a process for incrementing the address number of the pitcher character that cannot participate in a match event each time a match event ends, a process for determining whether the modified address number is a predetermined number or less, and a process for storing in a storage unit of the server the modified address number and an identification number that corresponds to the modified address number, if the modified address number is the predetermined number or less.

In this manner, in the network game system according to the fifth aspect, the element number of the array in which the identification number of the pitcher character that cannot participate in a new match event is an element is the address number of the address in which the identification number of the pitcher character that cannot participate in a new match event is disposed. This definition is performed in the server.

It can thereby be determined whether or not the pitcher character is managed in the server on the basis of the result of determining whether the address number modified at the end of each match event is a predetermined value or less. In this case, the pitcher character is managed in the server when the address number modified at the end of each match event is a predetermined value or less.

Stating the above description in general terms, in the network game system according to the fifth aspect, an object that affects the outcome of a match in a network competition game executed among a plurality of clients via a network can be managed as a pitcher character that cannot participate in a match event on the basis of the address number modified at the end of each match event. The management provides memory for ID storage of a predetermined number of addresses, and the ID of a pitcher character that has just appeared (or the highest number of innings pitched) is newly stored at the end of the match as described above. On the other hand, only the ID of the pitcher character that cannot participate is stored in the memory by removing the oldest ID from the memory (e.g., the number of addresses can be set to three, if appearance in three matches is not permitted after an appearance). Therefore, management can be carried out in a very simple manner because the pitcher character having the ID stored in the memory can be determined by the server in a simple manner to be unable to participate.

Three addresses must be prepared, if the number of matches in which an appearance is not permitted is, e.g., three matches. In this case, the capacity of three addresses is two bits ("00, 01, 10", 11). In other words, the required data can be stored with very low capacity because the required information can be assured as long as two bits of memory are available on the server for a single team.

The network game system according to a sixth aspect is the network game system according to the fifth aspect, wherein the following function is provided.

(11) In a group stipulation function, a group number for stipulating a plurality of the objects as the same group is recognized by the first control unit.

In the network game system, a group number for stipulating a plurality of objects to be the same group is recognized by the first control unit in the group stipulation function. An array in which the address number and the group number are element numbers, and in which an identification number of the pitcher character being managed (a pitcher character that cannot appear in a new match event) that corresponds to the element numbers is an element, is stipulated by the second control unit in the array stipulation function.

For example, a group number for stipulating a team to which a plurality of pitcher characters belongs is acknowledged by the first control unit, if a baseball game is executed by using the present network game system. An array in which the address number of the pitcher character and the group number of the team are element numbers and an identification number of the pitcher character that cannot appear in a new match event (an identification number that corresponds to the element numbers) is an element, is stipulated by the second control unit.

In this manner, in the network game system according to the sixth aspect, the element numbers of an array in which the identification number of the pitcher character that cannot participate in a new match event is an element is composed of the address number of the pitcher character and the group number of the team.

A pitcher character that cannot participate in a new match event can thereby be managed for each team. Accordingly, the player can be restricted from using in the current match a pitcher character (a pitcher character that cannot participate in a new match event) for which management was started in the server in the previous match when the same team has been selected, if various teams are selected and a competition game is carried out.

Stating the above description in general terms, in the network game system according to the sixth aspect, an object that affects the outcome of a match in a network competition game executed among a plurality of clients via a network can be managed for each group in the server. The player can thereby be restricted from using in the current match an object for which management was started in the server in the previous match when the same team has been selected, if various teams are selected and a competition game is carried out.

The game program according to a seventh aspect is a game program capable of executing a network competition game executed in a server computer and in a client computer connected to the server computer via a network.

The game program is provided with a competition notification function for causing a first control unit, which is a client, to execute a process for notifying the server of an execution of the competition game; a competition validation function for causing a second control unit, which is a server, to execute a process for validating the execution of the competition game in the client; a match execution function for causing the first control unit to execute a match event of the competition game when the execution of the competition game has been validated by the server; an object selection function for causing the first control unit to execute a process for selecting one object or a plurality of objects for participating in a match event of the competition game from among a plurality of objects on the basis of an input signal from an input part; an action frequency calculation function for causing the first control unit to calculate an action frequency of the object or objects that have participated in the match event of the competition game; an object extraction function for causing the first control unit to execute a process for selecting an object from the object or objects on the basis of the action frequency of the object or objects when the match event ends; an object notification function for causing the first control unit to execute a process for notifying the server about the selected object; an object management function for causing the second control unit to execute a process for managing, as an object that cannot participate in a new match event of the competition game, the object about which a notification has been sent from the client to the server; and a managed object notification function for causing the second control unit to execute a process for notifying the client about the object being managed in the server, if a new match event of the competition game is to be executed by the first control unit.

In the object selection function of the game program, a process for selecting one object or a plurality of objects for participating in the new match event from among a plurality of objects, excluding the notified object being managed, is further executed by the first control unit on the basis of an input signal from the input part.

The game apparatus according to an eighth aspect is a network game apparatus capable of executing a network competition game executed in a server computer and in a client computer connected to the server computer via a network.

The game apparatus is provided with competition notification means for causing a first control unit, which is a client, to execute a process for notifying the server of an execution of the competition game; competition validation means for causing a second control unit, which is a server, to execute a process for validating the execution of the competition game in the client; match execution means for causing the first control unit to execute a match event of the competition game when the execution of the competition game has been validated by the server; object selection means for causing the first control unit to execute a process for selecting one object or a plurality of objects for participating in a match event of the competition game from among a plurality of objects on the basis of an input signal from an input part; action frequency calculation means for causing the first control unit to calculate an action frequency of the object or objects that have participated in the match event of the competition game; object extraction means for causing the first control unit to execute a process for selecting an object from the object or objects on the basis of the action frequency of the object or objects when the match event ends; object notification means for causing the first control unit to execute a process for notifying the server about the selected object; object management means for causing the second control unit to execute a process for managing as an object that cannot participate in a new match event of the competition game any one of the objects notified from the client to the server; and managed object notification means for causing the second control unit to execute a process for notifying the client about the object being managed in the server, if a new match event of the competition game is to be executed by the first control unit.

In the object selection means of the game apparatus, a process for selecting one object or a plurality of objects for participating in the new match event from among a plurality of objects, excluding the notified object being managed, is further executed by the first control unit on the basis of an input signal from the input part.

The network game control method according to a ninth aspect is a game control method that can control a network competition game executed in a server computer and in a client computer connected to the server computer via a network, the control being carried out with the aid of the computers.

The network game control method is provided with a competition notification step for causing a first control unit, which is a client, to execute a process for notifying the server of an execution of the competition game; a competition validation step for causing a second control unit, which is a server, to execute a process for validating the execution of the competition game in the client; a match execution step for causing the first control unit to execute a match event of the competition game when the execution of the competition game has been validated by the server; an object selection step for causing the first control unit to execute a process for selecting one object or a plurality of objects for participating in a match event of the competition game from among a plurality of objects on the basis of an input signal from an input part; an action frequency calculation step for causing the first control unit to calculate an action frequency of the object or objects that have participated in the match event of the competition game; an object extraction step for causing the first control unit to execute a process for selecting an object from the object or objects on the basis of the action frequency of the object or objects when the match event ends; an object notification step for causing the first control unit to execute a process for notifying the server about the selected object; an object management step for causing the second control unit to execute a process for managing, as an object that cannot participate in a new match event of the competition game, the object about which a notification has been sent from the client to the server; and a managed object notification step for causing the second control unit to execute a process for notifying the client about the object being managed in the server, if a new match event of the competition game is to be executed by the first control unit.

In the object selection step of the game control method, a process for selecting one object or a plurality of objects for participating in the new match event from among a plurality of objects, excluding the notified object being managed, is further executed by the first control unit on the basis of an input signal from the input part.

In the present invention, a player can be restricted from successively using an object that affects the outcome of a match in a network competition game executed among a plurality of clients via a network, and a game that better reflects the realness of an actual game can be achieved. The storage capacity imposed on the client can be reduced in a network competition game executed among a plurality of clients via a network.

BRIEF DESCRIPTION OF THE DRAWINGS

Referring now to the attached drawings which form a part of this original disclosure:

FIG. 4 is a diagram (client) describing the correspondence relationship between a pitcher character that has appeared in a game and the number of pitches;

FIG. 5 is a diagram (server) for describing the correspondence relationship between an identification number and an address for managing a pitcher character that cannot appear;

FIG. 9 is a diagram (client) for describing in another embodiment the correspondence relationship between a pitcher character that has appeared in a game and the number of pitches; and FIG. 10 is a diagram (server) for describing in another embodiment the correspondence relationship between an identification number and an address for managing a pitcher character that cannot appear.

DESCRIPTION OF THE PREFERRED EMBODIMENTS

Configuration and Behavior of a Server and a Game Device

Figure 1:
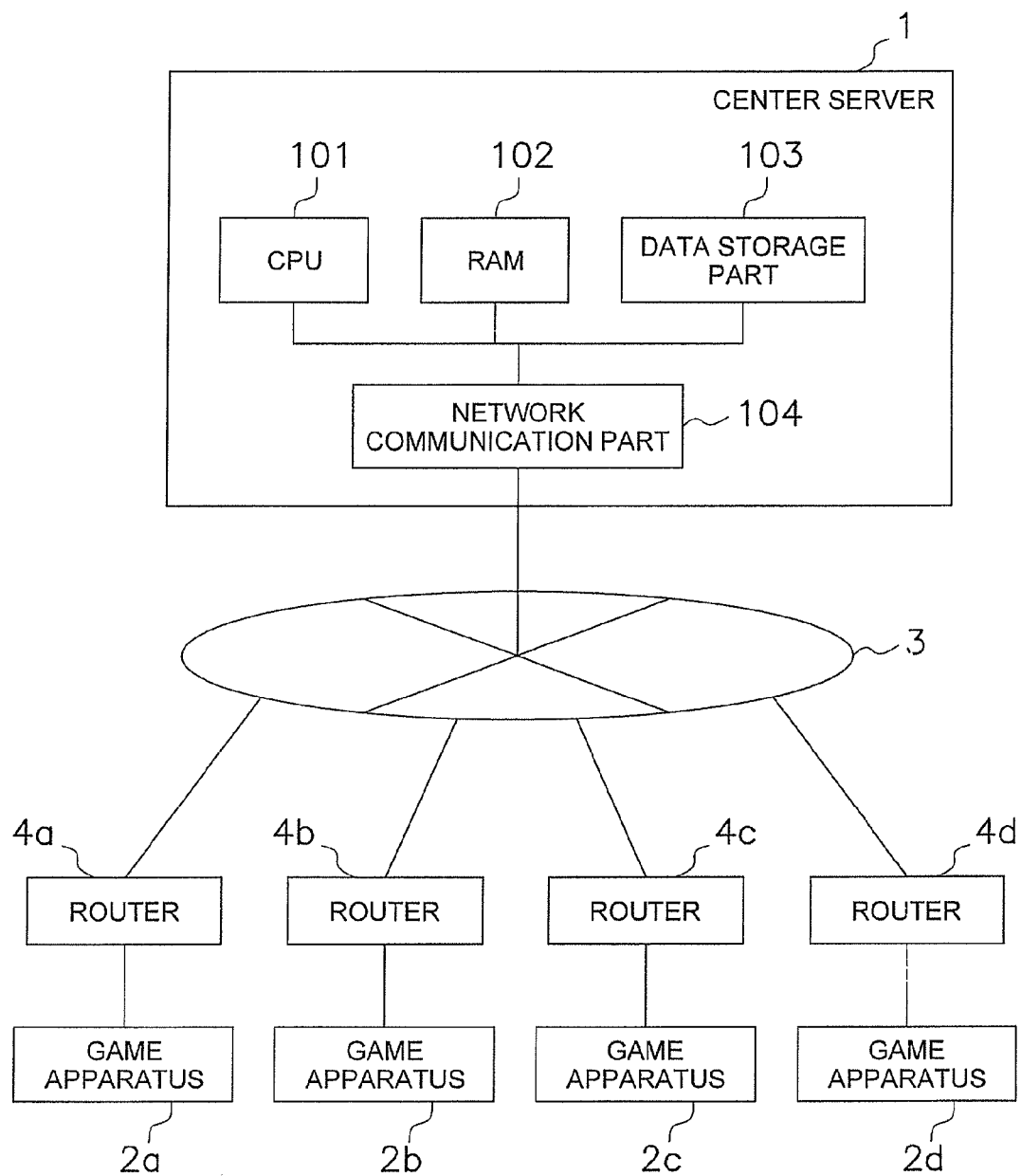
FIG. 1 is a diagram showing the general configuration of a network game system according to an embodiment of the present invention.

FIG. 1 illustrates a basic configuration of a game system of the present invention. This game system includes a server 1 and a game device 2 (client: 2a, 2b, 2c, 2d). As an example of a video game device, a home video game device 2 will be hereinafter explained. The game device 2 is connected to an external network 3 such as Internet via router 4 (4a, 4b, 4c, 4d). The server 1 is connected to the external network 3.

FIG. 1 illustrates an example of the case that the game device 2 is connected to the external network 3 via the router 4 (4a, 4b, 4c, 4d). However, the game device 2 may be connected directly to the external network 3 without the router 4 (4a, 4b, 4c, 4d).

The game device 2 or the home video game device includes a home video game console and a home television set. A recording medium 10 is configured to be loaded in the home video game console. Game data is arbitrarily read out of the recording medium 10 and a game is executed. The content of the game executed herewith is displayed on the home television set.

The server 1 records personal information data of players and sends the personal information data to the game device 2 which originally requests the data. The following process is executed on the server having the configuration as in FIG. 1.

The CPU (the second control unit) 101 reads and executes a program which is stored in a data storage part (a memory part) 103. The RAM 102 records temporarily the personal information data such as data set personally by a player when the player executes a game, and previous data about winning or losing, which are set on each game. For example, a hard disk is used as the data storage part 103. The control program and the personal information data being sent from the game device 2 are stored in the data storage part 103. A network communication part 104 sends and receives the data to/from the game device 2 via the external network 3.

The server 1 having the configuration as described above receives the personal information data, game data, etc. from the game device 2. The server 1 sends the game data necessary for execution of the game to the game device 2.

Figure 2:
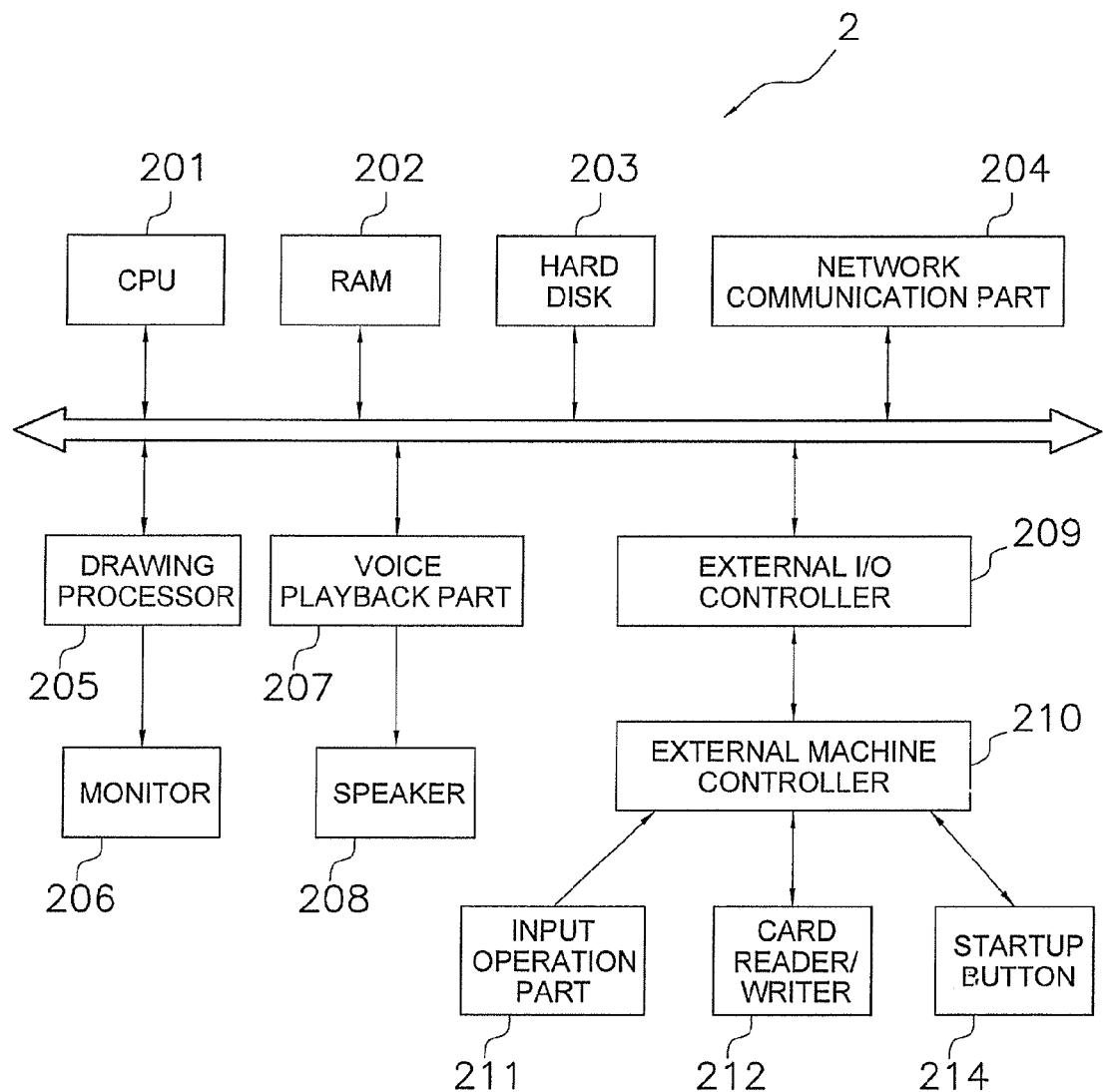
FIG. 2 is a diagram showing the hardware configuration of the game device.

The game device 2 executes the game based on the game data received from server 1 via the external network 3. FIG. 2 illustrates the configuration of the hardware of the game device 2.

The CPU (the first control unit) 201 executes a control program which is stored in the hard disk 203 as described later. The RAM 202 stores temporarily various types of constant numbers, parameters, and others. The hard disk 203 stores the control program, various types of parameters, and others. The network communication part 204 sends and receives the data to/from the server 1 and the other game device 2 via the external network 3. The monitor 206 displays various types of images for the game. The drawing processor 205 generates images to display on the monitor. The speaker 208 outputs sound when the game or the attract mode of the game are executed. The voice playback part 207 generates sound data for the speaker 208 to output.

An external machine controller 210 controls external machines such as an input operation part 211, the card reader/writer 212 and a startup button 214 as described later. The input operation part 211 is a controller including joysticks and buttons, and accepts the input from the players. The card reader/writer 212 reads and writes the data from/to a recording medium (ex. magnetic card). The startup button 214 is the button for starting up the game device 2. This button is mounted on the external surface of the game device 2. The game device starts up when the player pushes down this button.

An external I/O controller 209 generates control signals which are used to control the external machines. The external I/O controller 209 receives the signals from the input operation part 211, the card reader/writer 212, and the startup button 214 and sends the signals to the CPU 201.

The game device 2 executes the game based on the control program which is stored in the hard disk 203 as follows. The game device 2 starts up when the startup button 214 is pushed down. The game device 2 issues the request for connecting to the server 1 via the external network 3 when the network game has been implemented on the game device 2. The personal data stored in the data storage part 103 is sent to the game device 2 from the server 1 and downloaded in the game device 2 when the request is certificated by the server 1.

The game device 2 receives a network address of the opponent when the request for connecting the game device 2 is certificated by the server 1. In other words, the game device 2 sends own network address to the server 1 and receives the network address of the opponent, in case that the certificated player desires a match-up on the network. The game device 2 starts to execute the network game based on the network address of the opponent.

The data is sent and received between the game device 2 and the other game device 2 during match-up playing. For example, the data being sent and received includes input data for indicating operating orders by players and output data for outputting images and sounds.

Outline of Various Processing in a Game System

Figure 3:
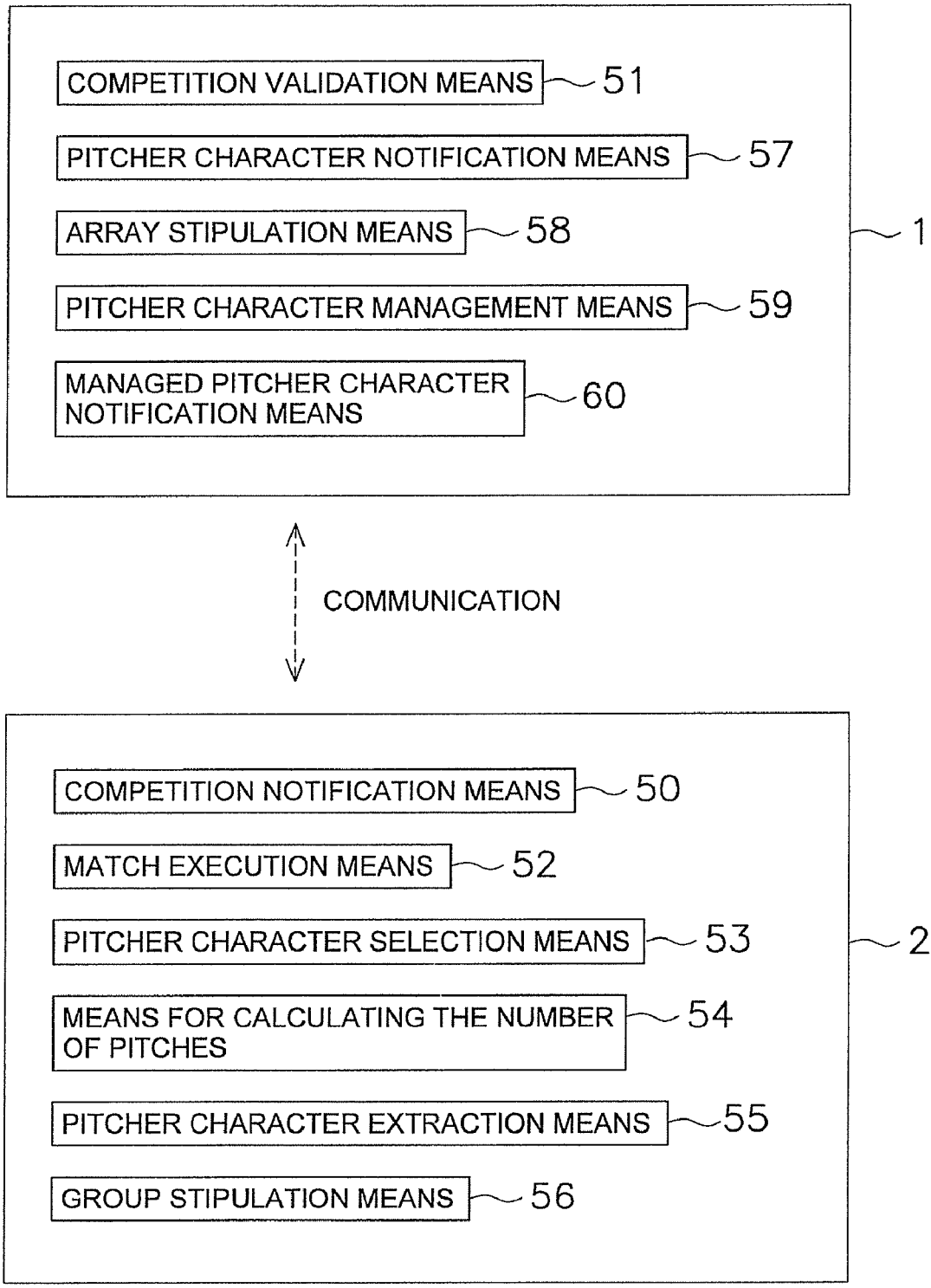
FIG. 3 is a diagram showing the functions carried out by the server and the game device (client)

The game executed in the present game system is, e.g., a baseball game. In the present game system, a network baseball game can be executed in a server and a game device (client) connected to the server via an external network. FIG. 3 is a function block diagram for describing the functions that play principal roles in the present invention. The functions (means) described below are implemented in a game device 2, as shown in FIG. 3.

Competition notification means (unit) 50 is provided with a function for causing the CPU 201 of the game device 2 to execute a process for notifying the server 1 that a baseball game is to be executed. In the competition notification means, the process for notifying the server 1 that a baseball game is to be executed is executed by the CPU 201 of the game device 2. For example, in the competition notification means, a connection request made by a certain game device 2a to the server 1 via the external network 3 is issued from the CPU 201 of the game device 2a in order for the player operating the game device 2a to execute a baseball game with a player operating another game device 2b.

Competition validation means (unit) 51 is provided with a function for causing the CPU 101 of the server 1 to execute a process for validating the execution of a baseball game in the game device 2. In the competition validation means, a process of validating the execution of a baseball game in the game device 2 is executed by the CPU 101 of the server 1. For example, in the competition validation means, the CPU 101 of the server 1 determines whether or not a connection request to the server 1 is a normal connection request. The process for validating the execution of a baseball game in the game device 2 is executed by the CPU 101 of the server 1 when the connection request has been determined by the CPU 101 of the server 1 to be a normal connection request.

Match execution means (unit) 52 is provided with a function for causing the CPU 201 of the game device 2 to execute a match event of a baseball game when the execution of the baseball game has been validated in the server 1. In the match execution means, the match event of a baseball game is executed in the CPU 201 of the game device 2 when execution of the baseball game has been validated in the server 1. For example, in the competition validation means, a network address of a competition counterpart is acknowledged by the CPU 201 of the game device 2 when the execution of a baseball game is validated by the CPU 101 of the server 1. Information of the competition counterpart is downloaded from the server 1 to the game device 2 and the competition counterpart is specified on the basis of the network address of the competition counterpart. At this point, a match event of a network baseball game is executed by the CPU 201 of the game device 2.

Pitcher character selection means (unit) 53 is provided with a function for causing the CPU 201 of the game device 2 to execute a process for selecting a pitcher character that is to appear in a match event of a baseball game from among a plurality of pitcher characters on the basis of an input signal form the controller 211. The pitcher character selection means is an example of an object selection unit and an object selection means. Also, the pitcher character selection means 53 is provided with a function for further causing the CPU 201 of the game device 2 to execute a process for selecting a pitcher character that is to appear in a new match event from among a plurality of pitcher characters, excluding a pitcher character that is being managed and about which a notification has been sent, on the basis of an input signal from the controller 211.

In the pitcher character selection means, the CPU 201 of the game device 2 executes a process for selecting a pitcher character that is to appear in a match event of a baseball game from among a plurality of pitcher characters on the basis of an input signal from the controller 211. Also, in the pitcher character selection means, the CPU 201 of the game device 2 further executes a process for selecting a pitcher character that is to appear in a new match event from among a plurality of pitcher characters, excluding a pitcher character that is being managed and about which a notification has been sent, on the basis of an input signal from the controller 211

For example, in the pitcher character selection means, a pitcher character that is to appear in a match event of a baseball game is selected from among a list of a plurality of pitcher characters that can appear in a match event by operating the controller 211. At this point, the identification number of a selected pitcher character is acknowledged by the CPU 201 of the game device 2. This process is executed for each pitcher character among all those selected in a single match event. In other words, the identification number of each pitcher character among all those selected in a single match event is acknowledged by the CPU 201 of the game device 2.

In the pitcher character selection means, a pitcher character that is to appear in a new match event is selected from among a list of a plurality of pitcher characters, excluding a pitcher character that is being managed and about which a notification has been sent, when a new match event has been executed. This process is executed for each pitcher character of all those selected in the new match event. In other words, the identification number of each of the pitcher character among all those (excluding the identification number of a pitcher character that is being managed and about which a notification has been sent) selected in the new match event is acknowledged by the CPU 201 of the game device 2. As used herein, the phrase "pitcher character that is being managed and about which a notification has been sent" corresponds to a notification about a pitcher character from the server 1 to the game device 2 in a later-described managed-pitcher character notification means.

Means 54 for calculating the number of pitches is provided with a function for causing the CPU 201 of the game device 2 to calculate the number of pitches of each pitcher character among all those that appeared in the match event of a baseball game. The means 54 for calculating the number of the pitches is an example of an action frequency calculation unit and an action frequency calculation means. In the means for calculating the number of pitches, the number of pitches of each pitcher character among all those that appeared in the match event of a baseball game is calculated by the CPU 201 of the game device 2. For example, in the means for calculating the number of pitches, the number of pitches of each pitcher character among all those that appeared in a single match event is calculated by the CPU 201 of the game device 2. The identification number of each pitcher character and the number of pitches of each pitcher character are acknowledged by the CPU 201 of the game device 2.

Pitcher character extraction means (unit) 55 is provided with a function for causing the CPU 201 of the game device 2 to execute a process for selecting any single pitcher character from among all the pitcher characters that have appeared, on the basis of the number of pitches of all the pitcher characters that have appeared when a match event has ended.

In the pitcher character selection means, the CPU 201 of the game device 2 executes a process for selecting any single pitcher character from among all the pitcher characters that have appeared, on the basis of the number of pitches of all the pitcher characters that have appeared when a match event ends. For example, in the pitcher character selection means, the CPU 201 of the game device 2 executes a process for searching for the maximum value among the number of pitches of each pitcher character among all those that have appeared when the match event ends. The identification number of the pitcher character that corresponds to the maximum number of pitches searched by the CPU 201 of the game device 2 is acknowledged by the CPU 201 of the game device 2. In this manner, the CPU 201 of the game device 2 executes a process for selecting the pitcher character that has thrown the most pitches.

Group stipulation means (unit) 56 is provided with a function for causing the CPU 201 of the game device 2 to acknowledge a team number for stipulating a plurality of pitcher characters to be on the same team.

In the group stipulation means, the team number for stipulating a plurality of pitcher characters to be on the same team is acknowledged by the CPU 201 of the game device 2. For example, in the group stipulation means, a team number for indicating that all the pitcher characters of a certain team are pitcher characters of the same team is acknowledged by the CPU 201 of the game device 2. The team number is stipulated in advance in the game program and a different number is assigned to each team.

Pitcher character notification means (unit) 57 is provided with a function for causing the CPU 201 of the game device 2 to execute a process for notifying the server 1 of the pitcher character that has thrown the most pitches. The pitcher character notification means is an example of an object notification unit and an object notification means. In the pitcher character notification means, the CPU 201 of the game device 2 executes a process for notifying the server 1 of the pitcher character that has thrown the most pitches. For example, in the pitcher character notification means, the CPU 201 of the game device 2 issues an identification number notification command for notifying the server 1 about the identification number of the pitcher character that has thrown the most pitches. At this point, the identification number of the pitcher character that has thrown the most pitches is transmitted from the game device 2 to the server 1 via the external network 3.

When a notification about the identification number of the pitcher character that has thrown the most pitches is sent to the server 1, the CPU 201 of the game device 2 issues a team number notification command for notifying the server 1 of the team number indicating the team to which the pitcher character belongs. At this point, the team number of the pitcher character that has thrown the most pitches is transmitted from the game device 2 to the server 1 via the external network 3.

Array stipulation means (unit) 58 is provided with a function for causing the CPU 101 of the server 1 to stipulate an array in which an address number indicating the address of the pitcher character being managed is an element number, and the identification number of the pitcher character being managed is an element disposed at the address indicated by the address number. More specifically, the array stipulation means 58 is provided with a function for causing the CPU 101 of the server 1 to stipulate an array in which the address number and the group number are element numbers and the identification number of the pitcher character being managed that corresponds to the element number is an element.

In the array stipulation means, the CPU 101 of the server 1 sets the array in which the address number and the group number are element numbers and the identification number of the pitcher character being managed that corresponds to the element number is an element. For example, in the array stipulation means, an array H for managing a pitcher character can be expressed as "H(AD, GP)=ID," wherein "AD" is the address number, "GP" is the group number, and "ID" is the identification number of the pitcher character. In this case, such an array H is defined by the CPU 101 of the server 1. Here, "0 (zero)" is assigned to the initial value of the address number. The group number used in this case is a number for stipulating a plurality of pitcher characters of the same team as the same group.

Pitcher character management means (unit) 59 is provided with a function for causing the CPU 101 of the server 1 to execute a process for managing a pitcher character notified by the game device 2 to the server 1 as a pitcher character that cannot appear in a new match event of a baseball game. The pitcher character management means is an example of an object management means and an object management unit.

In the pitcher character management means, the CPU 101 of the server 1 executes a process for managing the pitcher character notified from the game device 2 to the server 1 as a pitcher character that cannot appear in a new match event of a baseball game.

For example, in the pitcher character management means, the CPU 101 of the server 1 executes a process for managing any single pitcher character notified from the game device 2 to the server 1 as a pitcher character that cannot appear in a match event for a predetermined number of match events.

Specifically, in the pitcher character management means, the CPU 101 of the server 1 executes a process for incrementing the address number AD of the pitcher character being managed at the end of each match event. At this point, the array H for managing pitcher characters is modified to be "H(AD(=AD+1), GP)=ID". Also, the CPU 101 of the server 1 determines whether the modified address AD (=AD+1) is a predetermined number or less, e.g., 3 or less (AD(AD=+1) ≦3). 1f the modified address number AD (=AD+1) is 3 or less, the array H (H(AD+1, GP)=ID) composed of the modified address number AD (=AD+1) and the identification number ID of the pitcher character that corresponds to the modified address number AD (=AD+1) is stored in a data storage part 103 of the server 1. In this manner, the pitcher character is managed in the server 1.

Managed pitcher character notification means (unit) 60 is provided with a function for causing the CPU 101 of the server 1 to execute a process for notifying the game device 2 about a pitcher character being managed in the server 1, if a new match event of a baseball game will be executed by the CPU 201 of the game device 2. The managed pitcher character notification means is an example of a managed object notification unit and a managed object notification means. In the managed pitcher character notification means, the CPU 101 of the server 1 executes a process for notifying the game device 2 about a pitcher character being managed in the server 1, if a new match event of a baseball game will be executed by the CPU 201 of the game device 2. For example, in the managed pitcher character notification means, a management number notification command for notifying the game device 2 about the identification number ID of the pitcher character being managed in the server 1 is issued by the CPU 101 of the server 1 when a new match event of a baseball game is to be executed by the CPU 201 of the game device 2. At this point, the identification number ID of the pitcher character being managed in the server 1 is transmitted from the server 1 to the game device 2 via the external network 3.

General Overview of a Pitcher Rotation System in a Network Baseball Game

Figure 6:
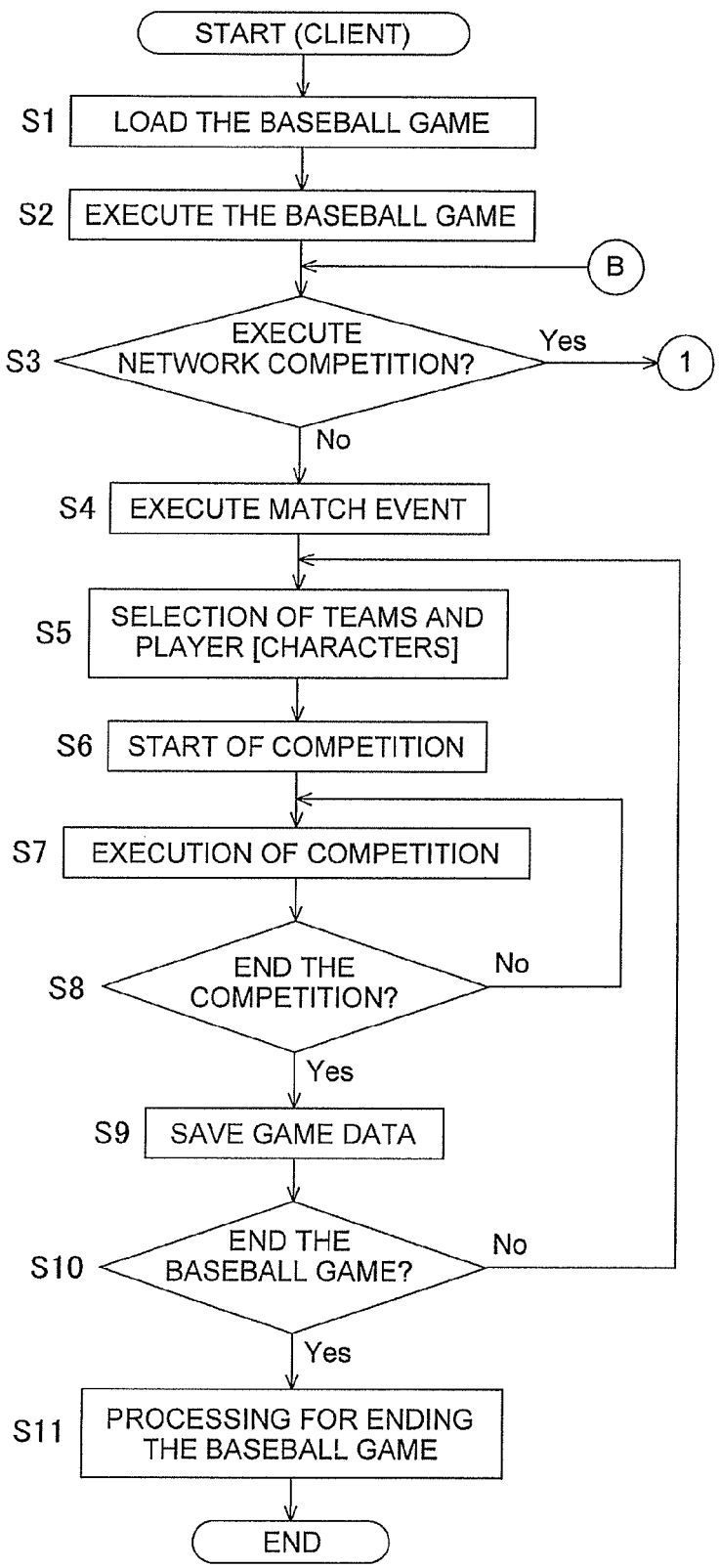
FIG. 6 is a flowchart (part 1) showing a pitcher rotation system in a baseball game.

Next, specific details of a rotation system in a baseball game will be described. The flow shown in FIGS. 6 to 8 will also be described at the same time.

First, a baseball game program is loaded from a recording medium and stored in RAM 202 when the power source of the game machine is switched on and the game machine is started up. At this time, various basic game data required for executing the baseball game are also read from the recording medium and stored in the RAM 202 at the same time (S1).

An example of basic game data includes data related to various images for a 3-D game space. The CPU 201 acknowledges the data related to various images for a 3-D game space, examples of which include stadium image data, player character image data, and various object image data. The basic game data includes position coordinate data for disposing data related to the various images for the 3D-game space in the 3-D game space. The basic game data also includes game data used in the pitcher rotation system.

Next, the CPU 201 executes (S2) on the basis of basic game data the baseball game program stored in the RAM 202. At this point, the startup screen (not shown) of the baseball game is displayed on a television monitor 20. Also, various setting screens (not shown) for executing the baseball game are displayed on the television monitor 20. Here, a selection screen (not shown) for selecting whether to, e.g., execute the baseball game in a single game device 2 or to execute the baseball game in two game devices 2 via the external network 3 is displayed on a monitor 206. In other words, the player operates the controller 211 to thereby select (S3) one of the competition modes, i.e., the client competition or the network competition, in the selection screen.

Client Competition

Here, when client competition has been selected (No in S3), the match event is executed (S4) by the CPU 201 of the game device 2. In the match event, first, the player operates the controller 211 to thereby select player characters that are to appear in a match and on a team commanded by the player. In other words, the team directed by the player and the player characters of the team directed by the player are selected (S5) based on an input signal from the controller 211. At this point, a competition start command for starting the competition event included in the match event is issued (S6) by the CPU 201. Also, the player characters that are to appear in the competition event are displayed on the monitor 206 by using the image data of the player characters.

In this state, the player and the player commanding the counterpart team operate the controllers 211, whereupon the action of the player characters that corresponds to the input signal from each controller 211 are controlled (S7) by the CPU 201 of the game device 2. In other words, the player operates the controller 211 to thereby directly control the actions of the player characters. On the other hand, there are also cases in which the player characters are controlled by the CPU 201 of the game device 2 on the basis of a game AI program (Artificial Intelligence Program). For example, rather than the player characters of the counterpart team being controlled by a player directing the counterpart team, the case in which the player characters of the counterpart team are automatically controlled by the AI program corresponds to the above-described situation.

In this manner, in the present match event of a baseball game, team selection, player character selection, player character commands, and the like are executed in accordance with instructions from a controller 211 and instructions from the AI program. In the present baseball game, there are also cases in which the match event as such is controlled in accordance with the instructions from the controller 211 and the instructions from the AI program.

The CPU 201 determines (S8) whether or not the competition event has ended when the match event has been executed in the manner described above. For example, the CPU 201 determines whether or not the number of innings has reached nine (innings). The CPU 201 executes (S9) a process for storing in the RAM 202 game data composed of the result of each player character in the competition event, the match result, and the like when it has been determined (Yes in S8) by the CPU 201 that a command has been issued indicating that the competition event has ended.

A selection screen (not shown) for selecting whether or not the baseball game that has ended is displayed (S10) on the monitor 206 when the game data is stored in the RAM 202. In this selection screen, the player operates the controller 211 to thereby select an item that indicates the end of the baseball game (Yes in S10), whereupon the CPU 201 executes (S11) a process for ending the baseball game. Here, continuity data or the like that is required when the baseball game is to be continued is stored in at least the RAM 202 or the hard disk 203 and is recorded in a recording medium inserted in a card reader/writer 212.

On the other hand, the player operates the controller 211 and selects an item in the selection screen that indicates the continuation of a baseball game (No in S9), whereupon the CPU 201 again executes the process of step 5 (S5).

The CPU 201 executes (S7) a competition event in a competition mode, e.g., a client competition mode selected in the selection screen as long as a command indicating that the competition event has ended has not be issued (No on S8).

Network Competition

Next, when network competition has been selected (Yes in S3) in step 3 (S3), a connection request is issued (S301) from the CPU 201 of the game device 2a to the server 1 so that a baseball game is executed between a player (player A) and another player (player B, competition counterpart player) via the external network 3, if network competition has been selected (Yes in S3) in step 3 (S3). Following is a description of the case in which player A has issued various commands in the game device 2a and player B has issued various commands in the game device 2b.

On the other hand, in the server 1, the CPU 101 constantly monitors (S101) whether or not a connection request has arrived from a client (game devices 2a, 2b). When a connection request from game devices 2a, 2b has been authenticated in the CPU 101 of the server 1, the CPU 101 of the server 1 determines (S102) whether or not the connection request is a normal connection request in the server 1 that has received the connection request. When the CPU 101 of the server 1 has determined (Yes in S102) that the connection request is a normal connection request, the CPU 101 of the server 1 authenticates (S103) the execution of a baseball game in the game devices 2a, 2b.

At this point, the CPU 101 of the server 1 sets (S104) the array H for managing a pitcher character (described later) that cannot appear in a competition event. For example, the CPU 101 of the server 1 sets the array H in which element numbers are the address number indicating the address of the pitcher character that cannot appear in a competition event and the team number for stipulating that the pitcher characters of the same team be the same group, and in which an element is the identification number (described later) of the pitcher character that cannot appear and is disposed in the address indicated by the address number. Specifically, an array H for managing a pitcher character that cannot appear is expressed as "H(AD, GP)=ID," wherein "AD" is the address number, "GP" is the team number, and "ID" is the identification number of the pitcher character. In other words, the array H is defined by the CPU 101 of the server 1. The array H in its initial state is "H(0, 0)=0".

Here, the array H for managing a pitcher character that cannot appear in a competition event is set for player A authenticated in server 1 as well as player B authenticated in server 1. For example, the array Ha for player A can be expressed as "Ha(ADa, GPa)=IDa," and the array Hb for player B can be expressed as "Hb(ADb, GPb)=Idb."

The CPU 101 of the server 1 determines (S 105) whether the address numbers ADa, ADb of the arrays Ha, Hb are 1 or more and 3 or less ($1 \leq AD \leq 3$) when the CPU 101 of the server 1 sets the array Ha, Hb in this manner.

A pitcher character that cannot appear does not exist when the address numbers ADa, ADb of the arrays Ha, Hb is not 1 or more and 3 or less (No in S105, (ADa, ADb)$\leq$0, (ADa, ADb)$\geq$4), and the CPU 101 of the server 1 does not execute a process for providing notification from the server 1 to each game device 2a, 2b about a pitcher character that cannot appear. In other words, the CPU 101 of the server 1 does not execute a process for issuing a management number notification command for notifying each game device 2a, 2b about the identification number ID of the pitcher character that cannot appear.

For example, the situation in which a player has executed a network competition for the first time corresponds to the case described above. In other words, in this case, the condition (AD$\leq$0) described above is satisfied because the array H (Ha, Hb) is "H(0, 0)=0." The situation in which a pitcher character that could not appear has become able to appear corresponds to this case. In other words, in this case, the condition (AD$\geq$4) described above is satisfied because the array H (Ha, Hb) is "H(AD($\geq$4), GP)=ID."

A notification about an identification number ID' (described below) of a pitcher character that cannot appear is sent from the server 1 to each game device 2a, 2b, if the address numbers ADa, ADb of the arrays Ha, Hb are not 1 or more and 3 or less (No in S105, (ADa, ADb)$\leq$0, (ADa, ADb)$\geq$4), and only the network address of the competition counterpart is transmitted (S106) from the server 1 to each game device 2a, 2b. The CPU 201 of each game device 2a, 2b is made to acknowledge network address of the competition counterpart, whereby the competition counterpart can be specified (S302) in each game device 2a, 2b.

The process of step 105 (S105) described above is executed for the address number ADa of the array Ha for player A and the address number ADb of the array Hb for player B.

The program executed in the game device 2a of player A and the program executed in the game device 2b of player B are essentially the same, as described below. Accordingly, the game in the game device 2a of player A and the game in the game device 2b of player B have the same control mode. Therefore, a detailed description of the process executed in the game device 2b of player B will be omitted below, and only the process executed in the game device 2a of player A will be described in detail.

In the description below, there are cases in which the expression "game device 2a" is substituted with the expression "game device 2". Also, there are cases in which the term "player A" is substituted with the term "player." There are furthermore cases in which supplementary letters a, b for distinguishing between player A and player B are omitted.

Next, the CPU 201 of the game device 2 executes (S303) a match event when the competition counterpart (player B) is specified (S302) in the game device 2 (game device 2a) of player A. In the match event, first, a team list and a player [character] list are displayed on the monitor 206. At this point, the teams to be directed by the players and the player characters that are to appear in the competition are selected (S304) from among a team list and player [character] list displayed on the monitor 206. For example, the player (player A) operates the controller 211, whereby the team to be directed and the regular player characters are selected from among a team list and a player [character] list displayed on the monitor 206.

The starting pitcher character is also selected at this point. For example, the player operates the controller 211, whereby the starting pitcher character is selected from among the pitcher list composed of a plurality of pitcher characters. Next, the identification number ID (IDa) of the selected starting pitcher character is acknowledged (S305) by the CPU 201 of the game device 2.

For example, the CPU 201 generates the pitcher list composed of a plurality of pitcher characters on the basis of the identification number ID of each of the plurality of pitcher characters. Accordingly, the CPU 201 of the game device 2 can be made to acknowledge the identification number ID of the selected starting pitcher character when the starting pitcher character has been selected from among the pitcher list composed of a plurality of pitcher characters.

The identification number ID of each of the plurality of pitcher characters is acknowledged by the CPU 201 as image data labels. In other words, the identification number ID of each pitcher character and the image data of each pitcher character for the list are associated by using as the label of the image data the identification number ID of each of the plurality of pitcher characters. The item image of each pitcher character for the pitchers list is included in the basic game data described above.

The team list and the player [character] list are also displayed on the monitor 206 of the game device 2b of player B. The same process as that executed by player A described above is also executed in the game device 2b of player B. The CPU 201 of the game device 2b can thereby be made to acknowledge the team directed by player B as well as the regular player characters. The CPU 201 of the game device 2b can be made to also acknowledge the identification number IDb of the starting pitcher character selected by player B.

In this manner, the competition start command for starting a competition event included in the match event is issued (S306) from the CPU 201 of the game device 2a of player A and the CPU 201 of the game device 2b of the player B when the team and the player characters (including the pitcher character) have been selected by player A and player B. Next, the player characters that are to appear in the competition are displayed on the monitor 206 of each player on the basis of the competition start command by using the image data for the player characters.

In this state, the CPU 201 of the game device 2 controls the player characters (S307) on the basis of an input signal from the controller 211 of each of the game devices 2a, 2b when the each player operates the controller 211. In other words, in the competition event, player A and player B operate the controllers 211, whereby the player characters of each team are directly controlled.

In other words, when the competition event is executed (S307) in the game device 2a, player A issues a command to the fielding player characters (pitcher character, catcher character, and field characters) or to the batting player characters (batter character and runner characters), whereby the competition event proceeds. At this point, player B issues a command to the batting player characters as the competition counterpart or to the fielding player characters as the competition counterpart.

In a state in which the competition event is proceeding in this manner, the CPU 201 of each game device 2 executes (S308) a process for calculating the number of pitches T (ID) of the pitcher character (starting pitcher character) currently appearing in the competition event. For example, the number of pitches T (ID) of the pitcher character is calculated by causing the CPU 201 to compute the number of pitch commands directed to the pitcher character.

The CPU 201 of the game device 2 determines (S309) whether or not a pitcher substitution command has been directed for changing the pitcher character currently appearing. For example, the identification number ID of the starting pitcher character and the number of pitches T (ID) of the starting pitcher character are acknowledged by the CPU 201 and stored (S310) in the RAM 202, if a pitcher substitution command is directed when player A or player B operate the controller 211 (Yes in S309). Next, the identification number ID of the replacing pitcher character (next pitcher character) is acknowledged (S311) by the CPU 201 and the pitcher character currently appearing is substituted with another pitcher character. At this point, the CPU 201 of the game device 2 executes (S312) a process for calculating the number of pitches T (ID) of the pitcher character (next pitcher character) as described above.

In this manner, the number of pitches T (ID) of the pitcher character currently appearing is calculated for all substituting pitcher characters rather than only the starting pitcher character. The process for calculating the number of pitches is executed while the pitcher character currently appearing is being substituted with the next pitcher character, or before the competition event ends. When the pitcher character currently appearing is switched with the next pitcher character, or when the competition event ends, the identification number ID of the pitcher character that appeared and the number of pitches T (ID) of the pitcher character are acknowledged by the CPU 201 and stored (S310) in the RAM 202, as shown in FIG. 4.

FIG. 4 shows an example of the case in which 20 pitcher characters (a1, a2, a3, . . . , a20) exist on a single team. In other words, an example is shown in which 20 identification numbers (ID_a1, ID_a2, ID_a3, . . . , ID_a20) exist. Also, the numbers shown in FIG. 4 correspond to the number of pitches T (ID) of each pitcher.

The CPU 201 determines (S313) whether or not the competition event has ended when a process such as the one described above is being executed. For example, the CPU 201 determines whether or not the number of innings has reached nine (innings).

The CPU 201 of the game device 2 executes (S314) a process for searching for the highest number of pitches T (ID) of all of the pitchers who have appeared in the competition event, if the CPU 201 has determined (Yes in S313) that a command has been issued indicating the competition event has ended. This process is executed for each team. Next, the CPU 201 of the game device 2 acknowledges (S315) the identification number ID' of the pitcher character that corresponds to the maximum number of thrown pitches Tmax searched by CPU 201 of the game device 2, as shown in FIG. 4. An example is shown in FIG. 4 for the case in which the identification number ID' of the pitcher character that corresponds to the maximum number of thrown pitches Tmax of each match is "ID_a1, ID_a3, ID-a5, ID_a4, . . . ." In this manner, the CPU 201 of each game device 2 executes a process for selecting the pitcher character that has thrown the most pitches in each team.

Next, the CPU 201 of the game device 2 issues a number notification command for notifying the server 1 about the identification number ID' of the pitcher character that has thrown the most pitches and the team number GP' of the pitcher character. At this point, the identification number ID' of the pitcher character that has thrown the most pitches and the team number GP' of the pitcher character are transmitted from the game device 2 to the server 1 via the external network 3.

The team number GP' transmitted to the server 1 in this case is used for managing the team to which the pitcher character that has thrown the most pitches belongs. For example, the pitcher character that has thrown the most pitches on the team prior to modification can be subsequently managed in the server 1 as long as the team number GP' is managed in the server 1, even if the player modifies the team when a network competition is to be carried out.

On the other hand, in the server 1, the CPU 101 constantly monitors (S107) whether or not the identification number ID' of the pitcher character that has thrown the most pitches and the team number GP' of the pitcher character have arrived from the game device 2 via the external network 3. When the CPU 101 has acknowledged (Yes in S107) the identification number ID' of the pitcher character that has thrown the most pitches and the team number GP' of the pitcher character, the CPU 101 of the server 1 executes (S108) a process for incrementing the address number AD of the array H for managing the pitcher character that cannot appear. Next, the array H for managing the pitcher character that cannot appear is modified to be "H(AD+1, GP')=ID'."

For example, the identification number ID' of the pitcher character that has thrown the most pitches in the first match is "ID_a1," as shown in FIG. 4. Accordingly, the array H for managing the pitcher character that cannot appear becomes "H(1, GP')=ID_a1" when the first match has ended, as shown in FIG. 5.

Similarly, the identification numbers ID' of the pitcher characters that have thrown the most pitches in the second match and thereafter are "ID_a3, ID_a5, ID_a4, . . . . " Accordingly, when each match ends, the address number AD is incremented at the end of the match, and the address number AD of the identification number ID', which is an element of the array H for managing the pitcher characters that cannot appear, is modified, as shown in FIG. 5. In FIG. 5, the first to fourth matches are shown in parallel so that the chronological changes can be readily ascertained, but the storage locations of the addresses in which the IDs are actually inputted are in only a single row (three locations) and the storage of a new ID and the removal of the oldest ID is carried out in the single row.

At this point, the CPU 101 of the server 1 determines (S105) whether the modified address number (AD=AD+1) is 1 or higher or 3 or lower ($1 \leq AD (=AD+1) \leq 3$). When the modified address number AD (=AD+1) is 1 or higher or 3 or lower (Yes in S105), the identification number ID' of the pitcher character that corresponds to the modified address number AD (=AD+1) and the identification number ID' of the pitcher character that has thrown the most pitches are stored in the data storage part 103 of the server 1. In other words, the modified address number AD (=AD+1), and the value of the array H, i.e., the identification number ID' of the pitcher character that has thrown the most pitches that corresponds to the identification number ID' of the pitcher character are stored (S109) in the data storage part 103 of the server 1. In this manner, a pitcher character that cannot appear is managed in the server 1. The identification number ID' of the pitcher character that has thrown the most pitches in the competition event and the network address of the competition counterpart are transmitted from the server 1 to the game devices 2a, 2b (S110).

Here, a pitcher character that cannot appear does not exist when the modified address number (AD+1) is 1 or higher and 3 or lower (No in S105), i.e., when the address number AD of the array H is 0 or lower or when the address number AD of the array H is 4 or higher (AD≦0, AD≧4). In other words, in this case, the identification number ID' of a pitcher character that cannot appear is not reported from the server 1 to each game device 2a, 2b, and all of the pitcher characters that belong to a team can be made to appear. At this time, only the network address of the competition counterpart is transmitted from the server 1 to each game device 2a, 2b (S106).

A process in the server 1 such as that described above can be used to stipulate that the pitcher character that has thrown the most pitches in a certain match cannot be made to appear for an interval of three matches beginning in the next match. However, the pitcher character that has thrown the most pitches in a certain match can be made to appear in the fourth match or thereafter.

For example, in FIG. 4, the pitcher characters that cannot appear in each match have the cell containing the number of pitches T (ID) shaded. The pitcher characters that cannot appear in each match are managed in the server 1 using the address AD and the identification number ID', which is an element of the array H (AD, GP'), shown in FIG. 5. The CPU 201 of the game device 2 acknowledges a pitcher characters that cannot appear by transmitting the identification numbers ID' of the pitcher characters that cannot appear to the game device 2. Next, the pitcher characters that cannot appear and that are currently being managed in the server 1, i.e., the pitcher characters for which the cell of the number of pitches T (ID) of FIG. 4 are shaded cannot appear in the match and are no longer listed in the pitcher list for selecting a pitcher character as described below.

Here, the CPU 201 executes (S307) a competition event in the network competition mode as long as a command indicating that the competition event has ended has not be issued (No in S313).

After the CPU 201 has determined that a command indicating that the competition event has ended has been issued (Yes in S313), the CPU 201 of the game device 2 executes the processes from step 314 (S314) to step 316 (S316), whereupon the CPU 201 executes (S317) a process for storing the game data in the RAM 202.

The selection screen (not shown) for selecting whether or not the baseball game to be ended is displayed on the monitor 206 (S318) when the game data is stored in the RAM 202. The player operates the controller 211 and selects the item indicating that the game is to be ended in the selection screen (Yes in S318), whereupon the CPU 201 executes (S319) a process for ending the baseball game. Here, continuation data or the like required when the baseball game is to be continued in a subsequent session is stored in at least the RAM 202 or the hard disk 203 and is recorded in a recording medium inserted into the card reader/writer 212.

On the other hand, when the player operates the controller 211 to select in the selection screen the item indicating that a baseball game is to be continued (No in S318), the selection screen of step 3 (S3) is displayed on the monitor 206. The CPU 101 of the server 1 executes a process for notifying the game device 2 about the network address of the competition counterpart (S106), or the identification number ID' of the pitcher character that has thrown the most pitches in a competition event and the network address of the competition counterpart, in accordance with the result of the conditions determination of step 105 (S105) described above, if the player has selected in the selection screen the network competition by operating the controller 211 (Yes in S3). For example, the CPU 101 of the server 1 issues a managed number notification command for notifying the game device 2 about the identification number ID' of the pitcher character that cannot appear. Next, the identification number ID' of the pitcher character that cannot appear that is being managed in the server 1 is transmitted from the server 1 to the game device 2 via the external network 3.

At this point, the pitcher list excluding the pitcher character that cannot appear notified from the server 1 to the game device 2 is displayed on the monitor 206 when a pitcher character is to be selected in step 304 (S304). For example, the pitcher list is displayed on the monitor 206 on the basis of the identification numbers ID of the pitcher characters other than the identification number ID of the pitcher character that cannot appear. A starting pitcher character that will be made to appear in the next match event is selected from among the pitcher list. Next, in step 305 (S305), the CPU 201 of the game device 2 acknowledges the identification number ID of the selected starting pitcher character. The CPU 201 of the game device 2 executes a process subsequent to step 305 (S305). The CPU 101 of the server 1 executes processes from step 101 (S101) to step 110 (S110) in accordance with the process executed by the CPU 201 of the game device 2.

As described above, in the present embodiment, a pitcher character with high ability is selected by the client on the basis of, e.g., the number of pitches T (ID), and a notification about the pitcher character is sent to the server. The pitcher character is managed in the server as a pitcher character that cannot appear in a new match event. The pitcher character is thereby restricted from appearing in a new match event to be carried out by the client. In other words, in a network baseball game, a pitcher character that has thrown many pitches, i.e., a pitcher character having high ability can be restricted from being successively used in the subsequent matches.

Other Embodiments (a) In the embodiment described above, an example was shown in which a pitcher character that has thrown the most pitches is selected in the pitcher character extraction means 55 from among all the pitcher characters that have appeared. However, the mode for selecting the pitcher character is not limited to the embodiment described above and may be carried out in any manner.

For example, the same pitcher character can be restricted from successively being used even when the pitcher character extraction means 55 is caused to execute a process such as the following.

In this case, in the pitcher character extraction means 55, the CPU 201 of the game device 2 executes a process for searching for a threshold value or higher at the end of a match event from among the number of pitches of each of all the pitcher characters that appeared. The CPU 201 of the game device 2 selects the pitcher character that has thrown the number of pitches that is equal to or greater than a threshold value. When the threshold value is set to, e.g., 90, the CPU 201 of the game device 2 selects the pitcher character that has thrown 90 or more pitches. A pitcher having high ability can be restricted from successively appearing in the same manner as the embodiment described above when processing is performed in this manner (see FIGS. 4 and 5). A pitcher character can be restricted from successively appearing in the same manner as FIGS. 4 and 5 by setting the threshold value to a range of greater than 20 and less than 100.

In the pitcher character extraction means 55 described herein, a plurality of pitcher characters having high ability can be selected. For example, the correspondence relationship between the identification number and the address for managing a pitcher character that cannot appear is shown in FIG. 10, if the correspondence relationship between the number of pitches and the pitcher character that has appeared is set to a threshold value of 90 for the case shown in FIG. 9. In other words, in the first match, two pitcher characters (a1, a7) are selected as pitcher characters having high ability. The pitcher characters can be restricted from successively appearing in the same manner as the embodiment described above in the second match and thereafter. In this case, a capacity of 2 bits or more is required as address capacity because the address of the plurality of pitcher characters must be provided. However, the required data can be stored using a very low capacity in comparison with a conventional system.

Figure 7:
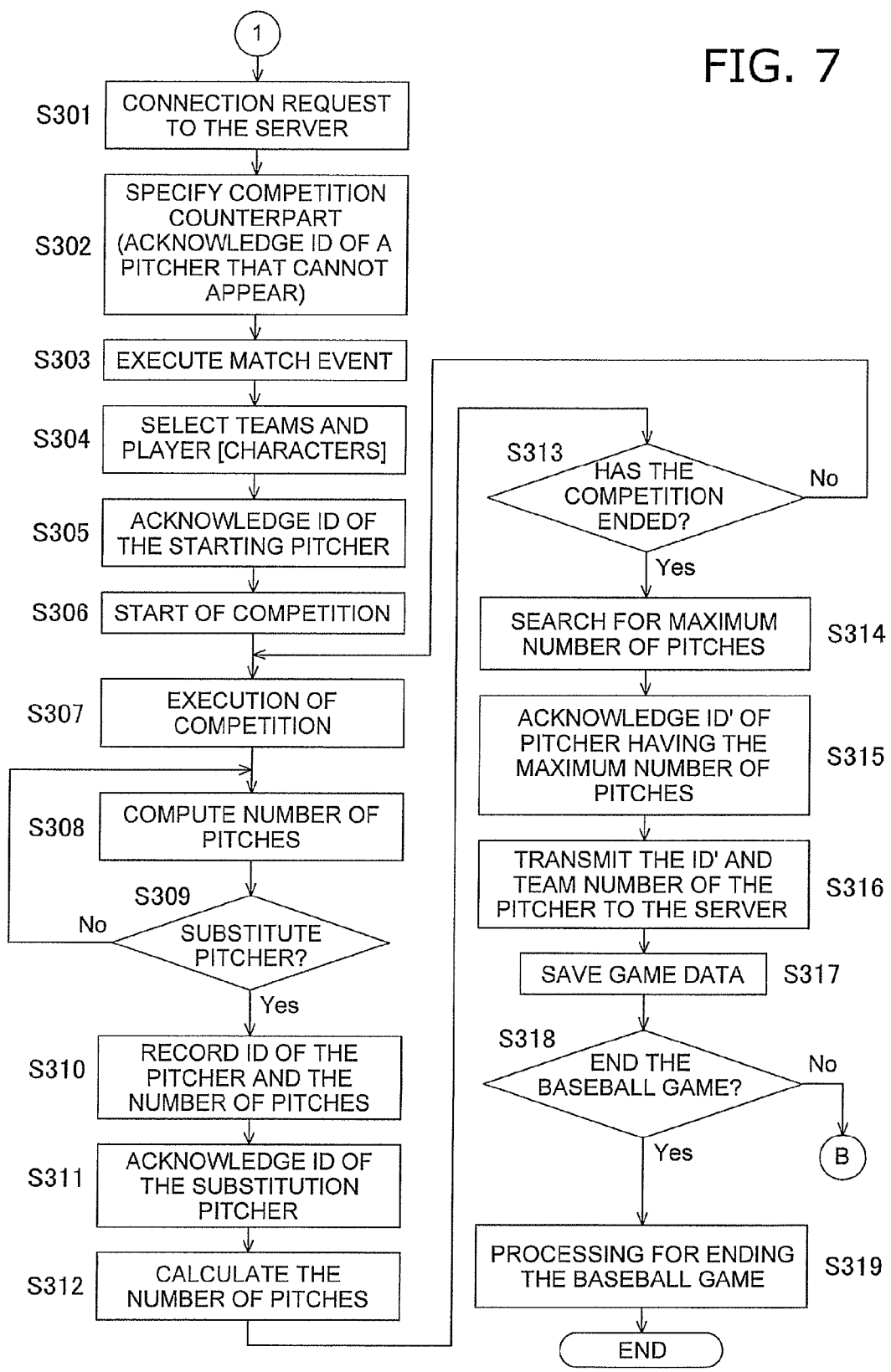
FIG. 7 is a flowchart (part 2) showing a pitcher rotation system in a baseball game.
Figure 8:
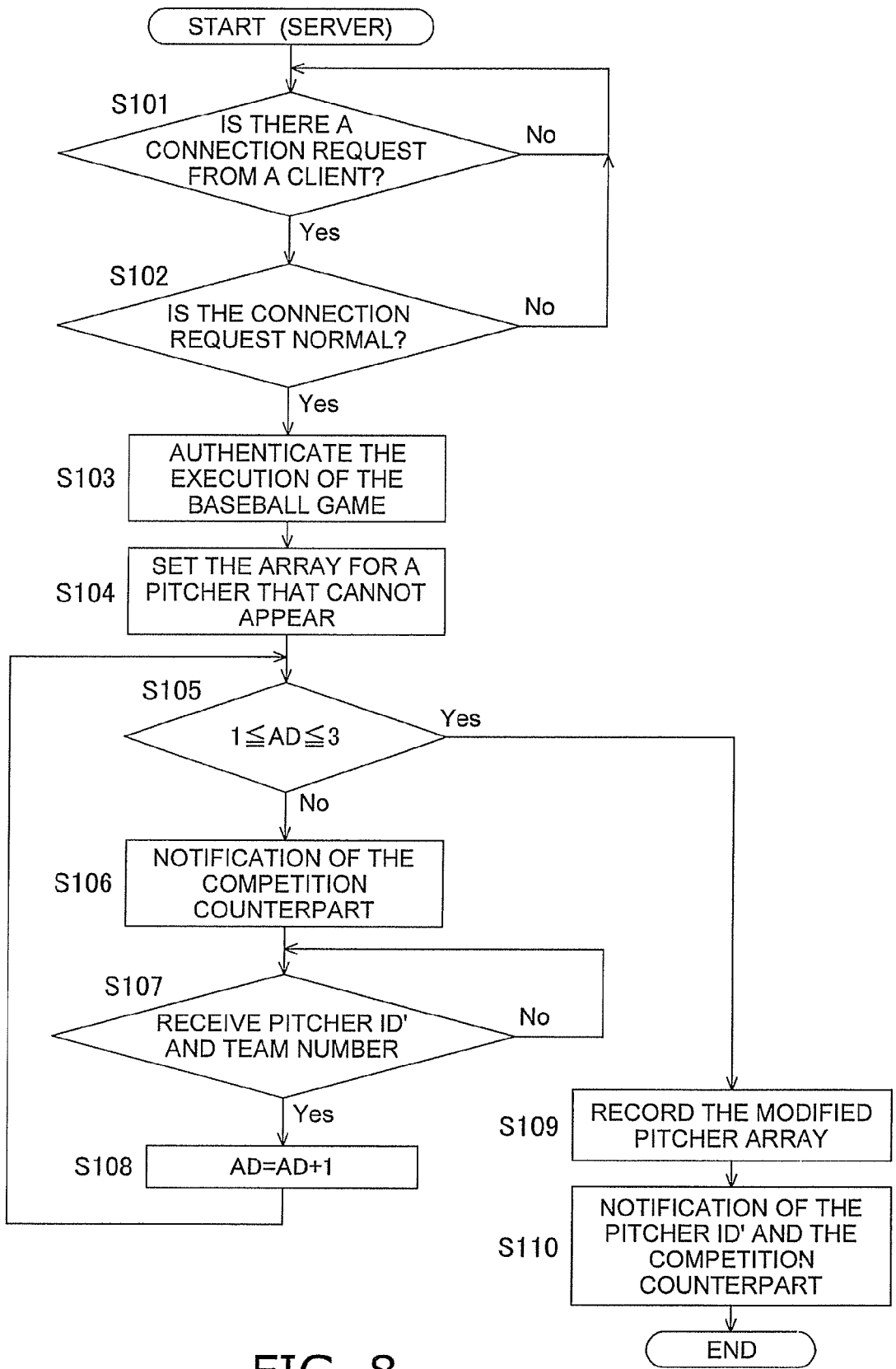
FIG. 8 is a flowchart (part 3) showing a pitcher rotation system in a baseball game.

In the case of the embodiment described herein, the number of pitches that is at or above a threshold value is searched in step 314 (S314) of FIG. 7. The pitcher character that has thrown the number of pitches that is equal or greater than the threshold value is selected in step 315 (S315) of FIG. 7. In this manner, the embodiment described herein can also be achieved in the same manner as the embodiment described above by executing steps 314 and 315 of FIG. 7.

(b) In the embodiment described above, an example was shown in which a baseball game was used as the network competition game, but the network competition game is not limited to the embodiment described above, and any type of games can be used. For example, when the present invention is applied to a competition game other than a baseball game, a specific object from among a plurality of objects that are to participate in a match event can be restricted from successively appearing in a match event.

(c) In the embodiment described above, an example was shown for the case in which a home video game device was used as an example of a computer to which the game program can be applied, but the game device is not limited to the embodiment described above and similar application can be made to a game device composed of a separate monitor, a game device integrated with a monitor, a personal computer or a work station that functions as a game device by executing a game program, as well as other configurations.

(d) Also included in the present embodiment are a program for executing the game and a computer-readable recording medium on which the program is recorded. In addition to a cartridge, examples of the recording medium include a computer-readable flexible disk, semiconductor memory, CD-ROM, DVD, MO, ROM, and cassette.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A network game system for executing a network competition game, the game system comprising:
   a server computer including a competition validation unit, an object notification unit, an object management unit, and a managed object notification unit; and
   a client computer connected to the server computer via a network, the network competition game being executed in the client computer, the client computer including a competition notification unit, a match execution unit, a first object selection unit, an action frequency calculation unit, an array stipulation unit, an object extraction unit, and a second object selection unit,
   the competition notification unit configured to make the client computer notify the server computer of an execution of the competition game,
   the competition validation unit configured to make the server computer validate the execution of the competition game,
   the match execution unit configured to make the client computer execute an first event of the competition game, if the execution of the competition game is validated,
   the first object selection unit configured to make the client computer choose a first selection from a plurality of objects on the basis of a first input signal from an input part, at least the first selection participating in the first event,
   the action frequency calculation unit configured to make the client computer calculate action frequencies of the first selection, when the first selection participates in the first event,
   the object extraction unit configured to make the client computer extract a first object from the first selection on the basis of action frequency of the first object when the first event ends,
   the object notification unit configured to make the client computer notify the server computer of the first object as a target object,
   the object management unit configured to make the server computer prevent the target object from participating in a second event subsequent to the first event, after the client computer notifies the server computer of the first object,
   the array stipulation unit is configured to make the server computer define an array in which an address number for the first object is an element number and an identification number for the first object is an element,
   the object management unit being configured to make the server computer increment the address number each time the event ends, to make the server computer confirm whether or not the address number is smaller than a predetermined number, and to make the server computer store the address number and the identification number that corresponds to the address number after incremented, if the address number is smaller than the predetermined number, in order to recognize the target object which corresponds to the identification number stored in the server computer as a managed object and prevent the managed object from participating for a prescribed number of events subsequent to the first event, the managed object notification unit configured to make the server computer notify the client computer that the managed object is prevented from participating the second event, if the second event is to be executed, the second object selection unit configured to further make the client computer choose a second selection from the plurality of objects excluding the managed object on the basis of a second input signal from the input part, at least the second selection participating in the second event.

2. The network game system as recited in claim 1, wherein the client computer extracts the first object from the first selection, if the action frequency of the first object is the largest in the first selection.

3. The network game system as recited in claim 1, wherein the client computer extracts the first object from the first selection, if the action frequency of the first object is larger than a threshold value.

4. The network game system as recited in claim 1, wherein the server computer prevents the first object from participating in a third event subsequent to the second event.

5. The network game system as recited in claim 1, wherein the client computer includes a group stipulation unit, the group stipulation unit configured to make the client computer stipulate a group number for the plurality of objects, and the server computer stipulates the array in which the address number and the group number are element numbers and the identification number for the first object is an element, the identification number corresponds to the element number.

6. A non-transitory computer readable medium storing a computer program for a network competition game executed in a server computer and in a client computer connected to the server computer via a network, the computer program comprising:

code for notifying the server computer of an execution of the competition game, code for validating the execution of the competition game;

code for executing an first event of the competition game, if the execution of the competition game is validated;

code for choosing a first selection from a plurality of objects on the basis of an input signal from an input part, at least the first selection participating in the first event;

code for calculating action frequencies of the first selection, when the first selection participates in the first event;

code for extracting a first object from the first selection on the basis of action frequency of the first object when the first event ends;

code for notifying the server computer of the first object as a target object, code for preventing the target object from participating in a second event subsequent to the first event, after the server computer is notified of the target object;

code for defining an array in which an address number for the first object is an element number and an identification number for the first object is an element, the code for preventing the first object from participating in the second event including code for incrementing the address number each time the event ends, code for confirming whether or not the address number is smaller than a predetermined number, and code for storing the address number and the identification number that corresponds to the address number after incremented, if the address number is smaller than the predetermined number, in order to recognize the target object which corresponds to the identification number stored in the sever computer as a managed object and prevent the managed object from participating for a prescribed number of events subsequent to the first event;

code for notifying the client computer that the managed object is prevented from participating the second event, if the second event is to be executed;

code for choosing a second selection from the plurality of objects excluding the managed object, at least the second selection participating in the second event.

7. A method for controlling the game system to execute a network competition game, the game system having a sever computer and a client computer connected to the server computer via a network, the network competition game being executed in the sever computer and the client computer, the method comprising:

notifying the server computer of an execution of the competition game;

validating the execution of the competition game;

executing an first event of the competition game, if the execution of the competition game is validated;

choosing a first selection from a plurality of objects to participate in the first event on the basis of an first input signal from an input part, at least the first selection participating in the first event;

calculating action frequencies of the first selection, when the first selection participates in the first event;

extracting a first object from the first selection on the basis of action frequency of the first object when the first event ends;

notifying the server computer of the first object as a target object;

preventing the target object from participating in a second event subsequent to the first event, after the server computer is notified of the first object;

defining an array in which an address number for the first object is an element number and an identification number for the first object is an element, the preventing the first object from participating in the second event including incrementing the address number each time the event ends, confirming whether or not the address number is smaller than a predetermined number, and storing the address number and the identification number that corresponds to the address number after incremented, if the address number is smaller than the predetermined number, in order to recognize the target object which corresponds to the identification number stored in the sever computer as a managed object and prevent the managed object from participating for a prescribed number of events subsequent to the first event;

notifying the client computer that the managed object is prevented from participating the second event, if the second event is to be executed;

choosing a second object from the plurality of objects excluding the managed object on the basis of a second input signal from the input part, at least the second selection participating in the second event.

* * * * *